(12) United States Patent
Shadchnev et al.

(10) Patent No.: US 9,224,164 B2
(45) Date of Patent: Dec. 29, 2015

(54) DATA PROCESSING SYSTEM AND METHOD FOR PROVIDING A HYPERLINK TO A LOWEST PRICED OFFERING OF A CURRENT ITEM

(75) Inventors: Evgeny Shadchnev, London (GB); Robin Landy, London (GB)

(73) Assignee: SKIMBIT LTD, London (GB)

( * ) Notice: Subject to any disclaimer, the term of this patent is extended or adjusted under 35 U.S.C. 154(b) by 656 days.

(21) Appl. No.: 12/731,025

(22) Filed: Mar. 24, 2010

(65) Prior Publication Data
US 2011/0238533 A1   Sep. 29, 2011

(51) Int. Cl.
*G06Q 30/06* (2012.01)
*G06Q 30/02* (2012.01)

(52) U.S. Cl.
CPC .............. *G06Q 30/06* (2013.01); *G06Q 30/02* (2013.01); *G06Q 30/0623* (2013.01); *G06Q 30/0641* (2013.01)

(58) Field of Classification Search
CPC .......................................... G06Q 30/00–30/08
USPC ................................................ 705/26.1–27.2
See application file for complete search history.

(56) References Cited

U.S. PATENT DOCUMENTS

| | | | | |
|---|---|---|---|---|
| 2007/0130090 A1* | 6/2007 | Staib et al. | ..................... | 705/400 |
| 2008/0091546 A1* | 4/2008 | Kirovski et al. | ................. | 705/26 |
| 2010/0100563 A1* | 4/2010 | Corella et al. | ................. | 707/770 |
| 2011/0106786 A1* | 5/2011 | Waters et al. | ................. | 707/709 |

OTHER PUBLICATIONS

Definition of "Add-on (Mozilla)" from Add-on (Mozilla)—Wikipedia, the free encyclopedia, download from link http://en.wikipedia.org/wiki/Firefox_extension on Mar. 18, 2010, 3 pages.
An Image of "Amazon Mechanical Turk—Welcome" web page, down load from link https://www.mturk.com/mturk/welcome on Mar. 18, 2010, 1 page.
Brad Stone—"The Fight Over Who Sets Prices at the Online Mall"—from The Fight over Prices on the Internet—NYTimes.com, downlaod from link http://www.nytimes.com/2010/02/08/technology/internet/08price.html on Mar. 18, 2010, 3 pages.

* cited by examiner

*Primary Examiner* — Michael Misiaszek
(74) *Attorney, Agent, or Firm* — Joshua D. Isenberg; JDI Patent

(57) ABSTRACT

A data processing system comprises a client device connectable to the internet, the client device having a web browser for accessing information via the internet; the web browser being operable to access a list providing groups of internet addresses of online retailer internet pages, each group having two or more internet addresses each relating to different respective retailers' offerings of an item for purchase, so that a current internet address being accessed by the web browser is compared with internet addresses in the list and, if the current internet address is found within one of the groups, the other internet addresses in the group are returned as alternative internet addresses relating to a current item being viewed; the web browser being operable to detect a retail price of the current item from each of the internet addresses in the group containing the current internet address; and the web browser being operable to compare the retail prices and indicate the lowest such retail price for the current item while displaying the internet page relating to the current internet address.

20 Claims, 8 Drawing Sheets

⋮

<p class="price">£10.85</p>                660

<a href="/add_to_cart?productid=123456">Add to Cart</a>    670

DATA PROCESSING SYSTEM AND METHOD FOR PROVIDING A HYPERLINK TO A LOWEST PRICED OFFERING OF A CURRENT ITEM

BACKGROUND OF THE INVENTION

1. Field of the Invention

This invention relates to data processing.

2. Description of the Prior Art

Consumer shopping over the internet has grown rapidly in volume over recent years. Almost any product can be bought in this way. With the growth of the overall business, there has been a corresponding increase in the number of retailers offering products for online purchase.

In the case of, for example, specific items of clothing which carry the retailer's label, there might be just one online shop for such items in a particular market (e.g. the United Kingdom market). However, for more common items such as books, CDs and DVDs, there can be many different online shops offering entirely identical products.

This then brings a problem to the consumer: how can the consumer know which is the best source for a particular online purchase?

A partial answer to this question is provided by so-called price comparison websites. These are provided by organisations which cooperate with online shops so as to receive so-called "feeds" of prices from the online shops. The feeds are, in effect, lists of product identifications and corresponding prices at that online shop. By receiving feeds from multiple shops, the price comparison website is able to generate a comparison of prices in respect of any particular item, and display the results of that comparison to a potential purchaser. The price comparison website also provides a hyperlink to the user for at least the lowest priced offering of that item, and possibly for all offerings of that item. This link is embodied as an area within the user's internet browser which is displayed along with an indication that if the user clicks (the term referring to the operation of a user control such as a mouse control to select that link) on the link, the user's browser will be redirected to the exact web page within the selected online shop on which that particular item can be selected for purchase. Typically, a user would make use of such a link if the user did decide to make a purchase: it is a free and convenient service to the user, but for the price comparison website it is very significant because it indicates the source of the referral to the online store.

Referrals of this type are a major source of income for price comparison websites. Sometimes the online store might pay the referring website a small commission simply for the fact that the potential purchaser has followed a link to that store. This is sometimes known as a "click through" payment. Also, if the user goes on to make an actual purchase of that item, the online store will typically pay a rather larger purchase commission to the referring website. These commissions do not form a direct cost to the user, in that the user will pay the same to purchase a particular item from a particular online store independent of whether the user entered the store directly or entered via a referring website. The referrals are generally provided as a free service to the user, because the price comparison websites want to encourage the user to enter a store via their referral.

There are at least four problems with price comparison websites of this type.

One is that the prices can be out of date. The pricing relies on feeds from the retailers, which are sent at intervals which are generally measured in days rather than minutes. So the prices may have changed since the last feed, which could mean that a user follows a referral to a particular store only to be disappointed that the actual price is greater than that shown on the price comparison website. Additionally, if one of the retailers lowers their price to become the actual cheapest retailer, but this is not reported by the price comparison site, then the user will be misled as to which retailer is actually selling at the lowest price.

Another problem for the owners of the price comparison websites is that there are now in fact many competing price comparison websites. While it is possible to take steps to try to ensure that a particular price comparison website will emerge as a highly ranked citation in a user search for a product, there remains the problem that user traffic will tend to be divided between several of the competing websites.

Another problem is that price comparison sites require the user to visit them and manually search for the required product in order to locate the lowest prices. Even if the user already knows exactly which product they wish to purchase, it can take considerable time and effort to locate it on the price comparison site.

Another problem is that the consumer can be prevented from accessing retailer prices at price comparison sites and online retailers following the 2007 Supreme Court ruling Leegin Creative Leather Products vs PSKS which enables manufacturers to stop retailers from openly promoting discounted prices. The effect of this ruling on price comparison sites is discussed in Reference 3.

It is an object of the present invention to provide an improved technique for providing price information to potential purchasers.

SUMMARY OF THE INVENTION

This invention provides a data processing system comprising:

a client device connectable to the internet, the client device having a web browser for accessing information via the internet;

the web browser being operable to access a list providing one or more groups of internet addresses of online retailer internet pages, each group having two or more internet addresses each relating to different respective retailers' offerings of an item for purchase, so that if information derived from a current internet address being accessed by the web browser relates to such a group of internet addresses, the other internet addresses in the group are returned as alternative internet addresses relating to a current item being viewed;

the web browser being operable to detect a retail price of the current item from each of the internet addresses in the group containing the current internet address; and the web browser being operable to compare the retail prices and indicate the lowest such retail price for the current item while displaying the internet page relating to the current internet address.

The invention provides a number of advantages over previous comparison techniques. For example, the price comparisons can be generated in real time, at the very time that the user is looking at an item for purchase. Also, the invention uses a web browser, which means that whenever the user is looking at internet sites for potential purchases, the comparison technique of the present invention can be carried out, leading to a potential source of steady income from referrals; that is to say, the user is not required to (a) decide to use a price comparison site, and (b) select a particular one.

Although exemplary embodiments of the client device are described below in the context of a client computer, it should be understood that the client device may be any type of internet-connectable data processing arrangement, such as a personal computer, a mobile telephone, a personal digital assistant, a games machine and the like.

Other respective aspects and features of the invention are defined in the appended claims.

BRIEF DESCRIPTION OF THE DRAWINGS

The above and other objects, features and advantages of the invention will be apparent from the following detailed description of illustrative embodiments which is to be read in connection with the accompanying drawings, in which:

FIG. 4 represents a portion of html code relating to a notional shopping web page;

DESCRIPTION OF THE PREFERRED EMBODIMENTS

In the following description, any references to web addresses represent hypothetical examples only.

Figure 1:
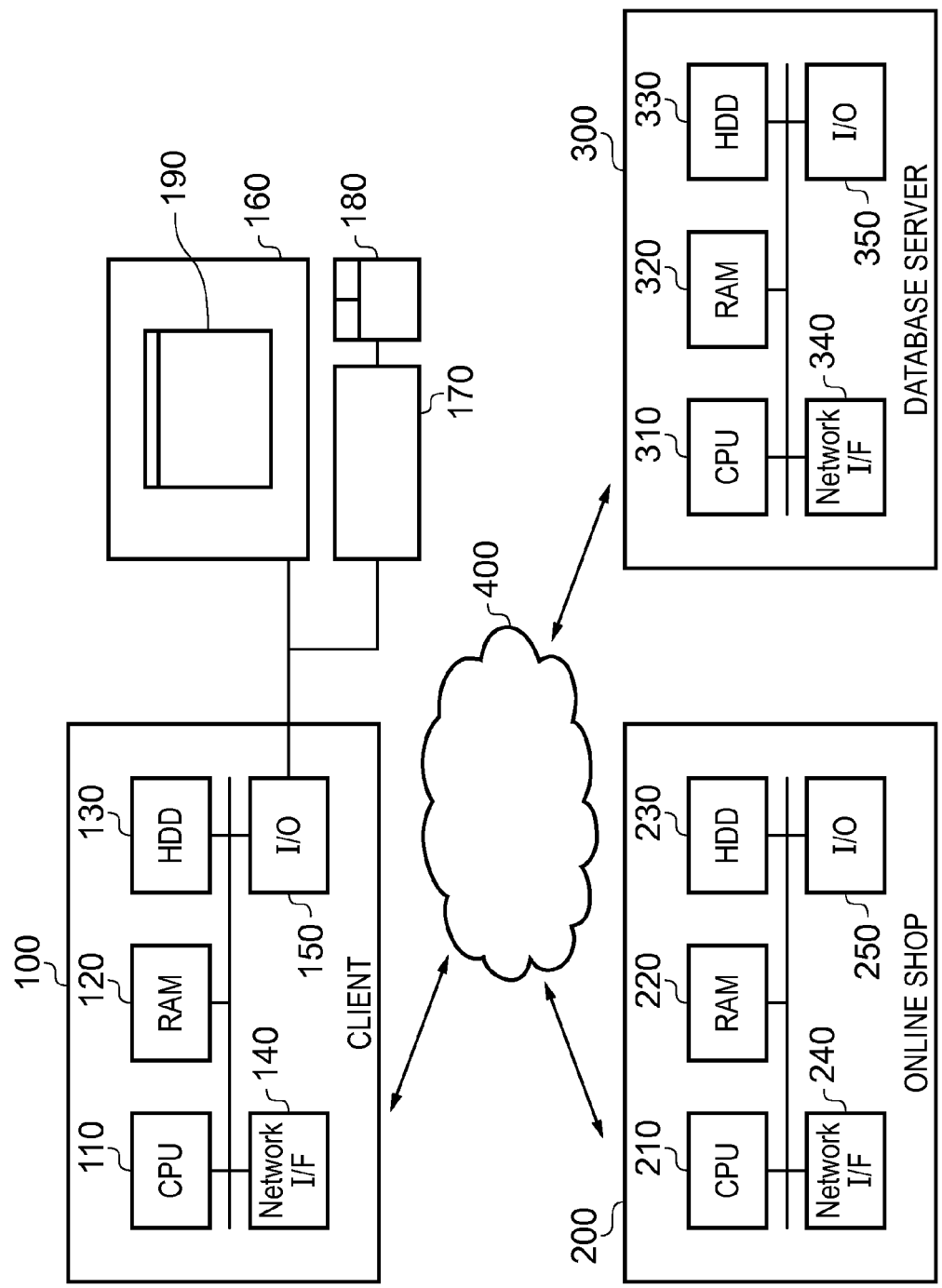
FIG. 1 schematically illustrates three computers connected via the internet.

FIG. 1 schematically illustrates three computers connected via the internet. These are schematic representations of three types of computer that will be discussed in the description below. The three types are: a client computer 100, an online shopping server 200 and a database server 300. The three are linked via an internet connection 400.

It should be understood that the term "client computer" may refer to any type of internet-connectable data processing arrangement, such as a personal computer, a mobile telephone, a personal digital assistant, a games machine and the like.

At a high level, the three computers share features in common. That is to say, each of the computers has one or more central processing units (CPUs) 110, 210, 310; memory storage shown schematically as random access memory (RAM) 120, 220, 320 (though various types of memory could be provided); non-volatile storage shown schematically as a hard disk drive (HDD) 130, 230, 330 (though other types of non-volatile storage such as flash memory could be provided); a network interface 140, 240, 340; and an input/output (I/O) controller 150, 250, 350. The client computer is shown as being connected, via the I/O controller 150, to a display screen 160, a keyboard 170 and a user input device such as a mouse 180. Similar devices may be connected to the online shopping server 200 and to the database server 300.

Each of the computers runs software in order to carry out its operations. The software may be stored on the HDD 130, 230, 330 and/or in the RAM 120, 220, 320, and may be provided via a removable storage medium (not shown) such as an optical disk, via a network or internet connection or otherwise.

Specifically, the client computer runs at least a software application known as a web browser 190. A web browser is a computer program for retrieving, presenting and traversing information resources on the World Wide Web. Examples of known web browsers include Microsoft® Internet Explorer®, Mozilla™ Firefox™, Google® Chrome™ and Apple® Safari™. The web browser is shown schematically in FIG. 1 as a display window, but it will of course be appreciated that a piece of running software on the computer 100 will interact with the CPU, the RAM, the HDD, the network interface and the I/O controller as well as with the display screen, keyboard and mouse. In the present example, the web browser 190 is Mozilla Firefox, though any of the browsers described above, or another browser, could be used.

At the date of filing, the Mozilla Firefox web browser is provided to users free of charge by a downloading process over an internet connection. That is to say, a Mozilla server computer (not shown) holds a copy of an installation package for the Mozilla Firefox web browser. A client computer can connect via the internet to the Mozilla server computer and retrieve a copy of the installation package over its internet connection. The installation package is then used locally at the client computer to install the Mozilla Firefox software onto the client computer.

Once this installation process has been done, the software is present and ready to run on the client computer in a basic form. This form allows basic web browsing operations to be performed. However, the functionality of the web browser software can be increased by installing so-called add-ons such as "extensions" or "plug-ins" to the basic form of the web browser software. For simplicity these will be generically referred to below as "extensions".

Extensions comprise additional software which can be used to modify the behaviour of existing features of the base application or to add entirely new features. Extensions are especially popular with the Mozilla Firefox web browser, because the browser software itself was designed to be minimalist and compact, but with an easy route to add extensions, so allowing users to customise the software to provide the exact functions they require. Some of the techniques used to provide extensions are described in Reference 1. Extensions can be made available to the public for wide (and generally free) access, by placing them within a directory of extensions overseen by Mozilla. In this way, a user can access the set of available extensions by operating a command from within the basic Firefox web browser. Once the user selects a desired extension, the directory provides an automatic link to a server holding software relating to that extension so that the user can download (retrieve) that extension and install it on the user's client computer.

In the present embodiment, the specific functionality described below which is not part of the basic functionality of the Mozilla Firefox web browser is provided by one or more extensions which the user can download and add to the basic Mozilla Firefox program. Once the extension has been installed, it interacts with the client computer as though part of the overall browser software. The main distinctions between the base browser software and an installed extension are to do with the respective sources of the software and the fact that an extension can be removed at the option of the user. So, it could be considered that the composite software (the basic browser software plus the extension) simply represents another example of browser software—in many ways the separation of "base" and "extension" software in respect of an installed extension is a slightly artificial one. Indeed, sometimes the functionality of popular extensions is incorporated into future releases (versions) of the base software.

Turning now to the online shopping server and the database server, at a high level these computers are generally similar to the client computer, though they are likely to have greater processing, storage and communication resources to allow them to interact with multiple client computers at the same time.

The online shopping server stores a database of products for sale, with each product having associated price, availability and description data. The online shopping server may also operate software dealing with payments and transactions. All of the software used on a typical online shopping server is well known to the skilled person at the date of the present application. In use, in order to make a purchase or to view products on the online shopping server, the user of the client computer directs his web browser to the base web address of the online shopping server. The client computer connects to the online shopping server and the user is provided with various options such as hyperlinks or search systems to move around ("navigate") from page to page within the set of web pages held by the online shopping server. Here it is noted that with few exceptions, online shopping servers operate so that each product for sale has at least one respective web page.

Only one online shopping server is shown in FIG. 1, for clarity of the diagram. In fact, of course, very many competing online shopping servers exist. Generally speaking, a user can buy the same product from many different sources, often at different respective prices.

The database server is established to interact with extension software running on a client computer. At a basic level, the database server stores a database of web (internet) addresses, otherwise referred to as URLs (uniform resource locators). An example of a URL is the web address giving information relevant to Reference 1 below. The database server stores multiple groups of URLs, with each group having two or more URLs, so that the URLs in a single group each relate to a respective retail offering of the same product. This arrangement will be described in greater detail below.

The database server operates so as to receive a query from a client computer in the form of a URL under test. The database server establishes whether that URL exists within one of the groups of URLs held by the database server. If it does exist within a group and the number of URLs in that group is below a threshold value (e.g. 30 URLs) it returns the other URLs within that group as a response to the client computer which initiated the query. Groups containing a very large number of URLs are likely to contain many invalid matches. The threshold value is set to prevent these URLs from being "scraped" (see below) and an invalid notification being shown.

The URLs can be stored and handled in a normalised form. Normalisation of URLs is described below.

Figure 2:
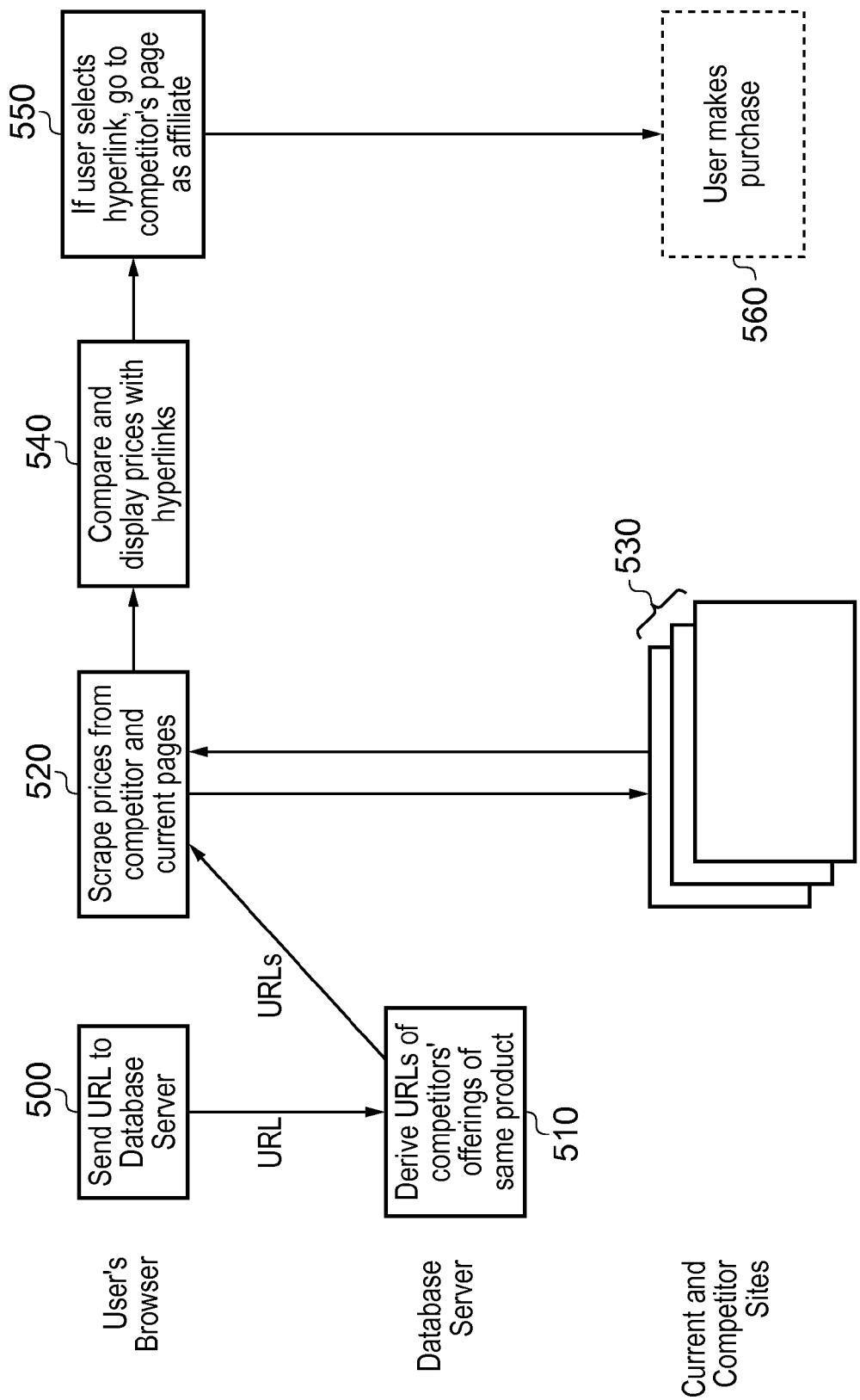
FIG. 2 is a schematic flow diagram illustrating an online shopping operation.

FIG. 2 is a schematic flow diagram illustrating an online shopping operation according to an embodiment of the present invention. The diagram relates to an attempt at online shopping by a user of the client computer, which starts with the user viewing a product on a particular online shopping server. The diagram is arranged as three rows, where each row relates to functions provided by a different computer or computers. In particular, the top row illustrates functions provided by the user's browser on the client computer, the middle row illustrates functions of the database server, and the bottom row illustrates functions provided by competitor online shopping servers (i.e. online shopping servers other than the online shopping server which the user is currently browsing) and the online shopping server which the user is currently browsing.

So, the process starts with the user using the web browser 190 of his client computer 100 to view a product at a particular online shopping server. At a step 500, the user's web browser sends the URL of the currently viewed page to the database server 300.

At a step 510, the database server detects whether the URL which it receives from the client computer is present in a group of URLs held in the database by the database server. If it is not present, the database server sends a negative reply to the client computer. In addition, if the URL is not present in any group, the server may try to find alternative URLs anyway, for example by contacting a preselected major shopping site and searching for that product there. However, if it is present in one of the groups, the database server replies to the client computer with the other URLs in that group.

The URLs in a group (in the database stored by the database server) correspond to different offerings of the same product. So, for example, two schematic groups of URLs are shown in the following table. In reality, the database server might hold many thousands of groups, each comprising perhaps of the order of two to twenty URLs. The groups can be populated (at least initially) from feeds provided by the online retailers. Here, it is simply necessary to match the feeds together, that is to say, to identify that a URL in a feed from one retailer relates to the same product as a URL from a feed from another retailer. This match may be carried out using a unique product identifier such as a barcode number or an ISBN (International Standard Book Number). Feed-based matching can also be achieved using non-unique identifiers i.e. MPNs or product titles.

| Group 1 | Group 2 |
| --- | --- |
| URL for product 1 at online shop 1 | URL for product 2 at online shop 1 |
| URL for product 1 at online shop 2 | URL for product 2 at online shop 3 |
| URL for product 1 at online shop 3 | URL for product 2 at online shop 5 |
| URL for product 1 at online shop 4 | URL for product 2 at online shop 6 |
| ... | ... |
| ... | ... |

At a basic level, the database server does not need to carry any information about the products themselves, just a list of URLs which relate to the same product. However, in other embodiments to be described below, the database server might carry additional information about the products themselves.

In the examples, it can be seen that the set of online shops offering product 1 is different to the set of online shops offering product 2. In general, each product is independent of the others and there is no requirement that the set of shops offering one product need have anything in common with the set of shops offering another product. However, in practice there is likely to be a set of shops which all offer (for example) DVDs, and so many DVD products may have corresponding groups in the database which cover substantially the same set of shops.

The database need not store any groups which have only one URL. A main purpose of the database is to reply to a query from a client computer by providing URLs of competing offerings of a certain product, so in some embodiments, groups of only one URL are not stored at all in the database. In other embodiments, such groups may be stored, in order to act as a placeholder in case further URLs relating to that product are discovered. In this situation a reply would still be sent to a client computer which has queried the single URL in such a group to confirm there were no other URLs in the group.

Any individual URL in the database is found in only one group. If a URL were in two groups, those groups would be amalgamated to form a single composite group.

The example described above involves URLs in the database being grouped together by a matching algorithm, in advance of receipt of a search query, into groups of URLs representing offerings of the same product by different retailers. Doing this grouping in advance has the advantage that the data is ready for quick access when required. However, it means that it is expensive and time consuming to make improvements to the matching algorithm. In particular, a change to the algorithm requires the entire database to be re-indexed, which could potentially take weeks and would be difficult to reverse. An alternative is to apply the product matching in real time, i.e. a URL received as a query is matched to other URLs in the database when the query is received. This means that significant data processing resources are required at the database server to achieve this real time matching, but it also means that the matching algorithm can be developed and changed much more easily; once a change has been implemented, it is possible to monitor whether the revised algorithm has led to any improvements in matching accuracy within a short time, just by monitoring user activity with respect to the notifications that they receive.

Returning to the step 510 of FIG. 2, on the assumption that the query sent by the client computer has resulted in a group of two or more URLs being identified in the database, the database server returns the other URLs in that group to the client computer.

At steps 520 and 530, the web browser of the client computer "scrapes" prices for the current product from the online shop which is currently being viewed by the user and from the competitor online shopping servers identified by the URLs returned by the database server. Price "scraping" refers to an automated software process of identifying the price of a particular product from the web page on which that product is offered for sale. This process will be described below in more detail with reference to FIGS. 3 and 4. For now, it is sufficient to say that the price scraping process provides to the web browser of the client computer numerical data representing the price of the current product at the current online shopping server and at each of the URLs identified in the reply from the database server.

At a step 540 the web browser of the client computer compares the numerical price data and displays information to the user relating to the prices and, if appropriate, hyperlinks to the competitor web pages offering that same product. Examples relating to the step 540 will be discussed below with reference to FIG. 5.

Significantly, the price information shown at the step 540 is completely up to date, having been freshly obtained, on demand, at the time of display.

At a step 550, if the user selects one of the hyperlinks to a competitor's web page, the web browser connects to that web page. The connection identifies the source of the referral of the user to that web page, which in this example means that the connection identifies the provider of the extension software providing the functionality of steps 500, 520, 540 and 550 (which would generally be the same as the provider of the database server giving the functionality of the step 510). The link to the competitor's site is therefore made with the extension provider as an "affiliate" of the competitor's online shopping service in order to earn payment from that shop. The nature of this affiliation will be described below with reference to FIG. 6. The example affiliate process is described here and in FIG. 6 as being operated by the retailer. This is true for retailers who have their own affiliate scheme, but there are other options.

For example, other affiliate schemes may be operated by "affiliate networks" acting as middle-men between the referrer and the retailer. The affiliate network usually tracks clicks—through and resulting sales. The affiliate network usually pays the referrer (in this case, the provider of the extension software) rather than the retailer paying the referrer. Additionally, the affiliate link may actually be an intermediary or 'redirect' URL which enables the affiliate network to record the referrer's click and then triggers a second URL which takes the user to the relevant page at the retailer's site. Importantly, because the functionality described here is provided as part of a web browser, it is not necessary for the user to make a special effort to choose to look at a price comparison site (of which there are many). Instead, the opportunity to earn affiliate payments is always present, because the web browser will be in use, and the current operations will be carried out as a background process, whenever the user is carrying out online shopping.

Finally, at a step 560, the user might make a purchase of the item from the competitor's website. This is carried out in a conventional way, with the extension provider as an affiliate.

Figure 3:
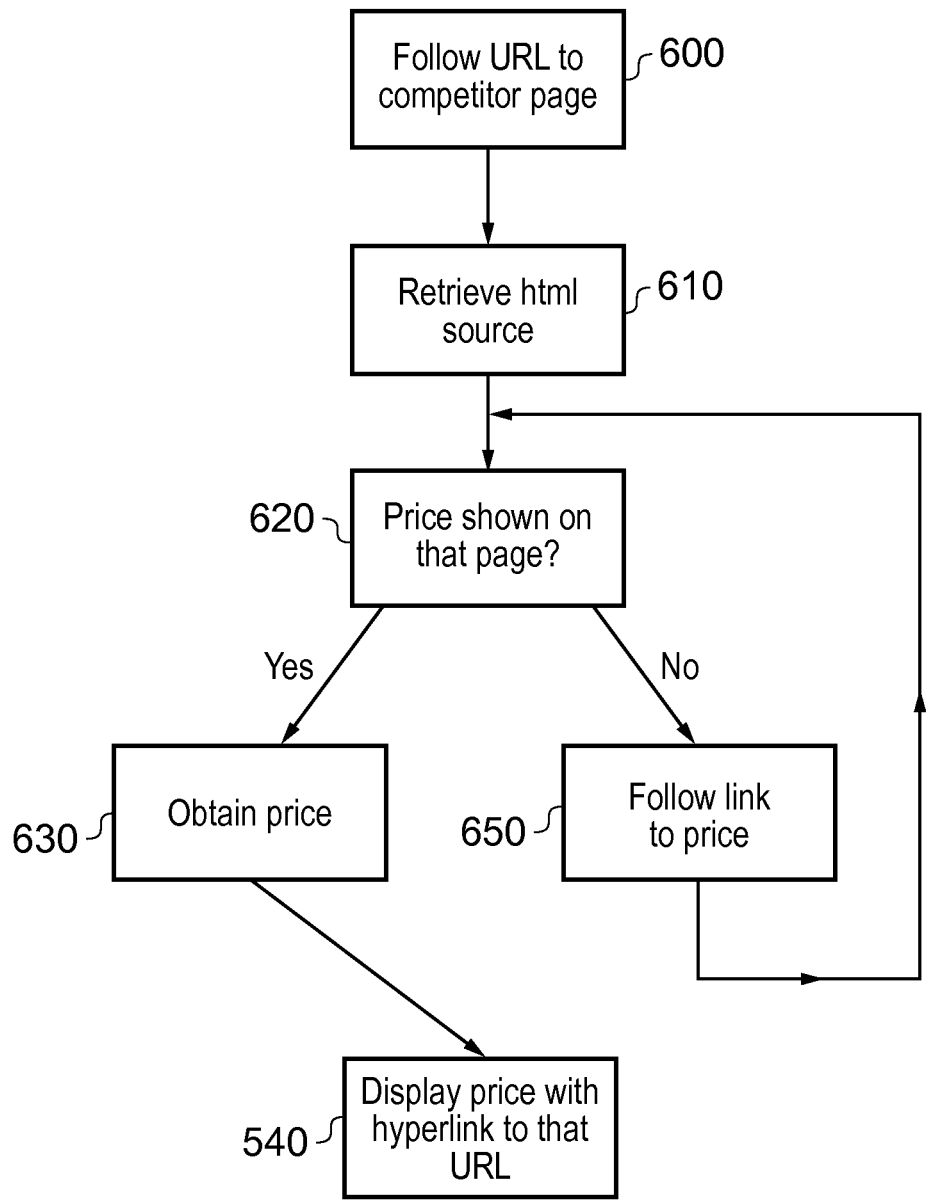
FIG. 3 is a schematic flow diagram illustrating a price scraping operation.

The steps 520 and 530 referred to a price scraping operation. Of itself, basic price scraping is a known technique, but for completeness, and to introduce some aspects of price scraping which go beyond the conventional use of the term, it will now be described. FIG. 3 is a schematic flow diagram illustrating a price scraping operation and FIG. 4 represents a portion of html code relating to a notional shopping web page.

Referring to FIG. 3, at a step 600 the client computer's web browser follows a URL (as provided by the database server) to a competitor's web page offering the same product as the product which the user is currently viewing. This is done as a background process, on receipt of the competitor URL from the database server. This background process is invisible to the user and if it fails, the user is not notified about it.

At a step 610 the web browser retrieves the html (hypertext markup language) source script which defines the competitor's web page. In general, a web page which presents an attractive visual offering of a product to the user is defined by a long series of html commands which define the layout of the web page including text, images and hyperlinks to appear on the web page. A small portion of an example html script relating to a web page by a hypothetical online shop called "exampleseller.com" offering a DVD for the film "Dorian Gray" for sale is shown in FIG. 4.

At a step 620 the web browser detects whether a retail price is shown on the retrieved page. The web browser achieves this by maintaining and consulting a small database of identifiable patterns within the html code used by the set of online shops covered by the URLs held by the database server. The entries in this database are generated manually (by inspecting html code of online shops' web pages) by the operators of the database server 300 and is passed to the web browser as a regular update (e.g. at start-up of the web browser, or once a week). Alternatively, of course, the information could be returned by the database server with the URLs at the step 510, though such an arrangement could increase network traffic and tend to slow down the response of the system.

An example entry in the database referred to in the preceding paragraph is as follows:

| Online shop | Identifiable pattern |
|---|---|
| exampleseller.com | <p class="price">DVD £[$price_exampleseller.com] | where the string <p class="price">DVD £ when found in the html script identifies that the numerical value immediately following that string indicates the price of the item, which is stored by the web browser as the variable $price_exampleseller.com. In the example shown in FIG. 4, the presence of this string is marked in FIG. 4 as a price 660 and is identified as £10.85.

Returning to FIG. 3, if the step 620 identifies that a price is shown on that web page, the price is retrieved at a step 630 and is temporarily stored by the web browser 190. Control then passes to the step 540 of FIG. 2 to display that price and a hyperlink to that web page.

If however the step 620 detects that the current page (as identified by the URL supplied by the database server) does not in fact display a valid price, then at a step 650 the web browser detects whether the page contains a hyperlink to a page which would display a price, before passing control back to the step 620. Again, the presence of such a hyperlink is by searching for known html strings used by that online shop to indicate such hyperlinks. The hyperlink might be a relatively simple link (for example, a link along the lines of "click here to see our latest price for this item") in which case the step 650 simply involves following that simple link and applying the step 630 to obtain the price. Alternatively, the link might be more complicated. An example is as follows.

In the example, a price is not provided by the particular online shopping server under consideration until the user has proceeded towards buying that item. So at the step 650, the web browser follows a link identified using the techniques described above as "add to basket" or, in the example shown in FIG. 4, as "add to cart" 670. This places the item into an online shopping basket or cart. The step 650 then identifies a "view basket" link using the same techniques and follows that link, so that the step 630 can scrape the price of the item within the basket. For thoroughness, the web browser can optionally then follow a further link (again, obtained from the html code by the string matching techniques described above) to delete the item from the basket.

A maximum number of retries, that is to say, a maximum number of times that the loop 620-650 can be followed, may be imposed by the web browser. An example maximum number in this context is three. If the system fails to identify a price by the end of the third attempt, price scraping can be aborted in respect of that URL. The way in which failed price scraping processes are dealt with is discussed below with reference to FIG. 9.

The process shown in FIG. 3 is carried out separately in respect of each URL returned to the web browser 190 by the database server 300.

The description above relates to price scraping from a competitor's web page, i.e. a web page other than the page which the user is currently viewing. However, a similar technique is also applied at the steps 520 and 530 to scrape a price from the web page which the user is currently viewing.

Figure 5:
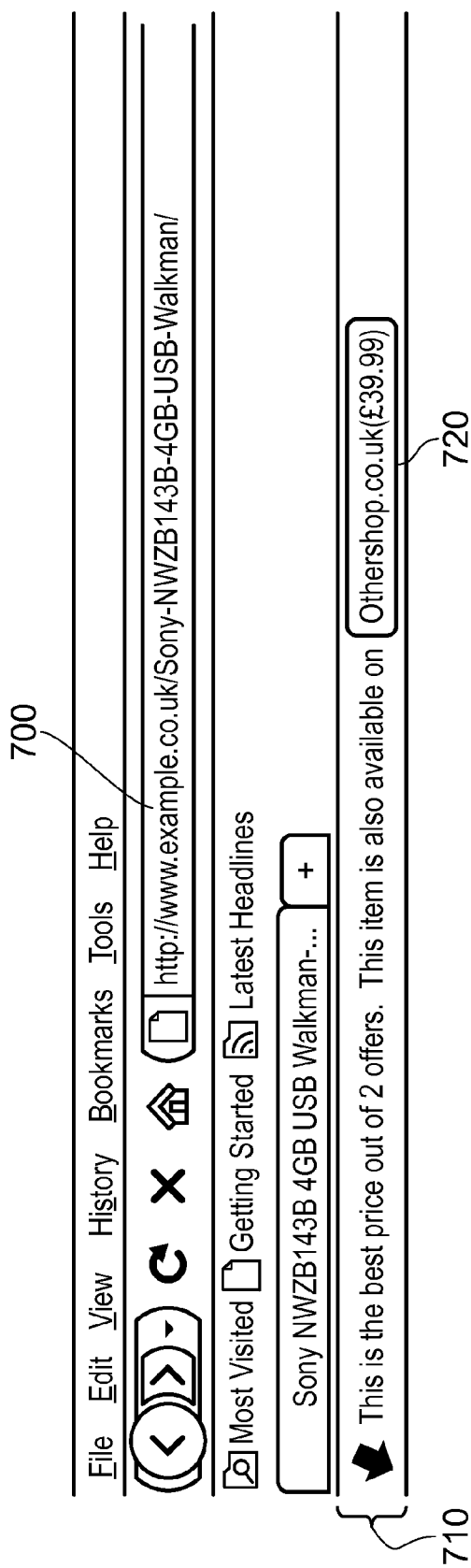
FIG. 5 schematically illustrates a part of a user's screen display.

FIG. 5 schematically illustrates a part of a user's screen display which is relevant to the description above of the step 540 of FIG. 2.

The example shown in FIG. 5 relates to a user viewing a web page from a particular online shop (in this example a hypothetical shop called example.co.uk) for a particular model of a Sony® MP3 player. The image shown in FIG. 5 represents an upper part of a display window of a web browser 190 on the client computer, and the URL of the specific web page at example.co.uk relating to the current product is shown in an address region 700 of the browser. It is that URL which the browser sends to the database server at the step 500 of FIG. 2. Preferably the URLs are normalised, so opening any of the following example URLs:

http://www.example.com/ipod-touch-16gb
http://example.com/ipod-touch-16gb/
http://www.example.com/ipod-touch-16gb/?referrer=ih&campain=abcd
http://www.example.com/catalogue?product=ipod-touch-16gb will cause the URLs to be normalized (reduced) to a standard form, e.g. http://www.example.com/ipod-touch-16gb, so the system can identify the product irrespective of the URL used to navigate to it.

The actual details of the current product on example.co.uk appear in the display window below the portion shown in FIG. 5. They are omitted from the drawing for clarity, as they are not relevant to the present technical discussion.

The extension to the web browser inserts an additional information "bar" (horizontal region) 710 at the top of the web browser's display window. This information bar provides display space to indicate the price comparison derived at the step 540 in FIG. 2. In general, as each scraped price is obtained (i.e. as the process of FIG. 3 reaches the steps 630 and passes control back to the step 540 of FIG. 2 for each URL) the price comparison information displayed in the information bar 710 is updated so as to show the best price out of those currently identified.

In FIG. 5, one alternative price of £39.99 has been obtained (from a hypothetical online shop called othershop.co.uk), and this alternative price is in fact higher than the price offered by the web page at example.co.uk which the user is currently viewing. So the information bar identifies the alternative offering and provides a hyperlink (via a button 720) to the web page of that alternative offering, but also provides confirmation that the current web page offers the best price out of those for which results have been obtained so far. Note that there is no need for the information bar to display the price as offered by the currently viewed web page, as this price information is in fact given on the currently viewed web page itself.

If a competitor offered a better price then the information bar 710 could display information such as:

"This item is cheaper at [Othershop.co.uk (£31.99)]"
where the square brackets [ ] delimit text to appear on the hyperlink button 720.

If more than one competitor site with a better price has been identified, then the information bar could carry information such as:

"This item is cheaper elsewhere. [Click here for alternatives]"

so that when the user clicks on the hyperlink button 720 a vertical or other list of alternative online shops is provided, with each entry in the list indicating the name of the shop and the price, so that clicking on that name or price activates a hyperlink to the web page of that offering.

Figure 6:
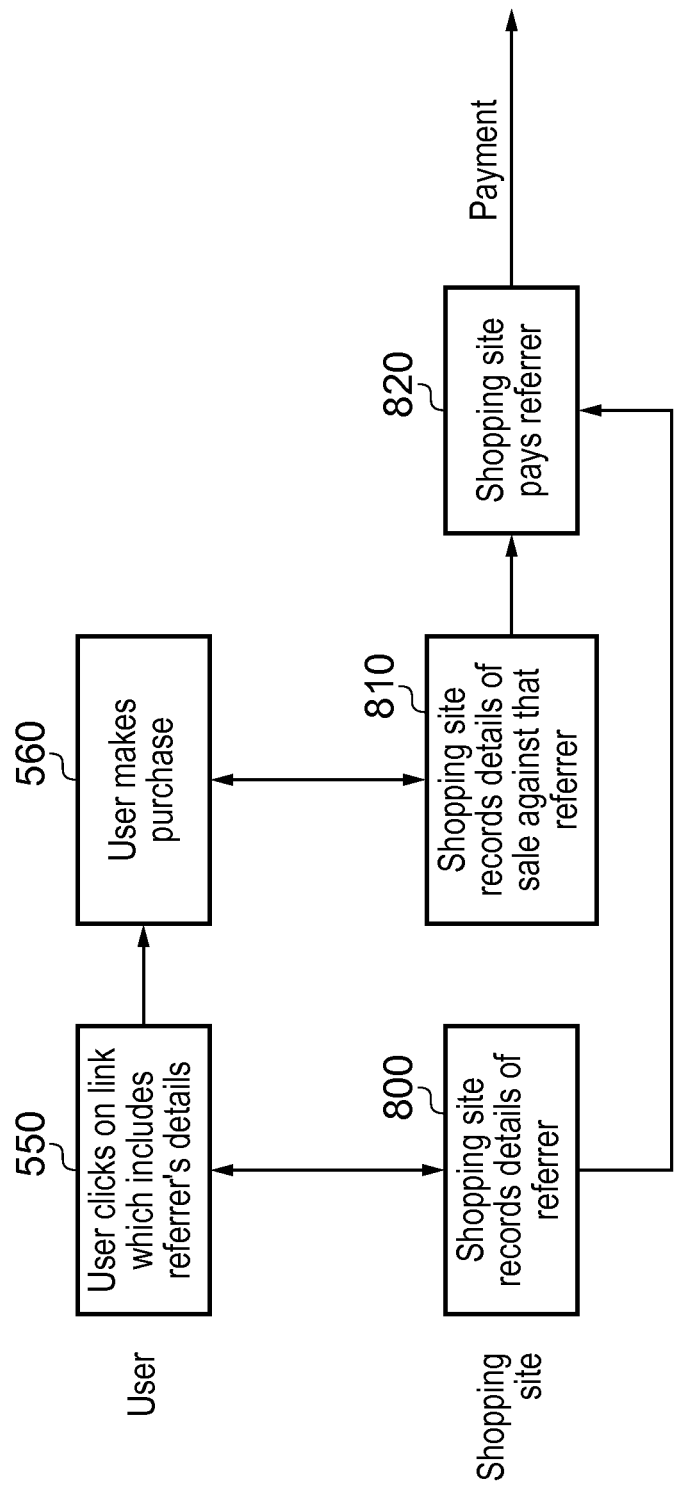
FIG. 6 is a schematic flow diagram illustrating a referral payment arrangement.

FIG. 6 is a schematic flow diagram illustrating a referral payment arrangement, otherwise referred to above as an affiliate scheme. Steps carried out at the browser 190 are shown on a top row, and steps carried out at the shopping site are shown on a lower row. (Of course it is appreciated that in any client-server interaction, processes are shared between the client and the server, so the division shown here is purely to assist with the explanation. In fact, to stress this point, the step 560 is shown in FIG. 2 as a server operation and in FIG. 6 as a client operation; in fact it is of course both, and the way it is illustrated is simply chosen in order to assist with explanation).

The hyperlink derived by the web browser at the step 540 not only includes sufficient information to identify the competitor shop and the relevant product page, it also includes data identifying the referrer, which in this case is the provider of the extension software (i.e. not the user himself). So at a schematic level the hyperlink might look like:
www.other_shop.co.uk/?product=product_name&referrer=extension_software_provider_ID The referrer information is invisible to the user. This doesn't mean that the user is prevented from seeing it, but rather that it generally has no effect, from the user's point of view, on the web page to which the user is redirected when he clicks on the hyperlink. Rather, the referrer information is simply used by the competitor web page (or an affiliate network) to collect information regarding the referrer.

Returning to FIG. 6, the step 550 discussed above involves the user selecting a hyperlink prepared (in the form just described) at the step 540. From there, control passes to the step 560 and to a step 800. At the step 800 the online shopping server currently accessed by the user records details of the referrer, as derived from the hyperlink used to access that server, and passes those details to a step 820. In other embodiments, not shown, an affiliate network could stand between the user and the online shop, with the affiliate network recording details of the purchase but allowing the shop to handle the actual purchasing process.

If the user decides to make a purchase at the step 560, then at a step 810 the online shopping server records details of that sale against the particular referrer, and again passes this information to the step 820.

At the step 820, the provider of the online shopping server pays the referrer for the referrals. This could be in the form of a small payment for each shopper who is referred on to the online shopping server. This type of payment is sometimes referred to as a click through payment. Another form of payment is a commission on the actual sale. Such commissions are generally much larger than click through payments. In some cases both types of payments can be provided.

Figure 7:
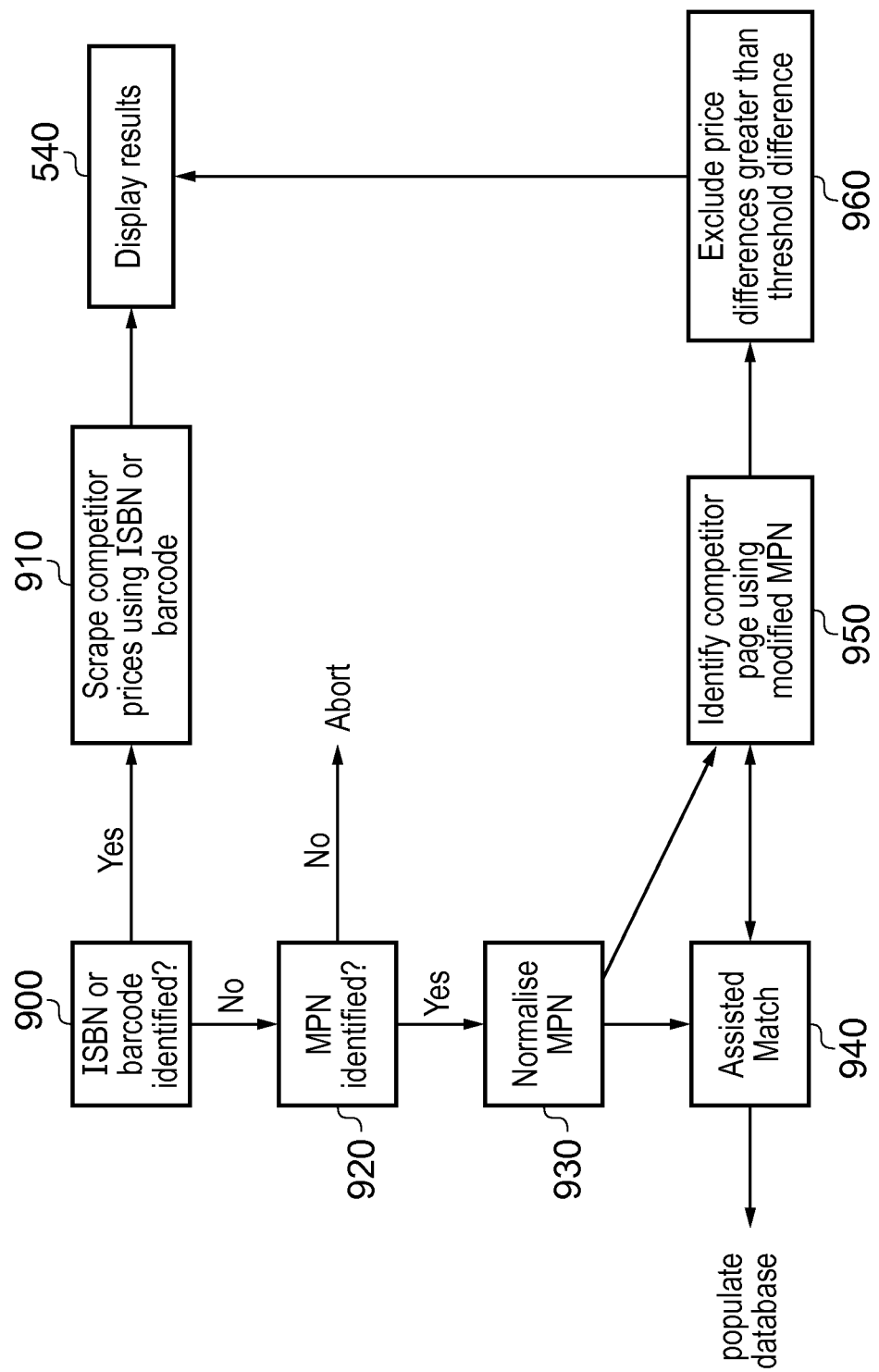
FIG. 7 is a schematic flow diagram illustrating a product identification process.

FIG. 7 is a schematic flow diagram illustrating a product identification process. This process applies in the instance that the browser 190 sends to the database server (at the step 500) a URL which is not recognised as such (i.e. it is not in one of the groups in the database) but the retailer to which that URL belongs is recognised by the database server (that is to say, the retailer is one of a list of retailers for which the database server stores URLs).

At a step 900, the current page and/or URL is scraped by the web browser to identify a possible unique identifier such as a barcode or ISBN identifier. If that is successful, then at a step 910 competitor prices can be obtained via that identifier. For example, a competitor website might have one possible standard URL format as:
www.other_example.co.uk/ISBN=1234567891
so that a URL for that competitor can be built without having to find the URL in the database (alternatively, the ISBN number can be sent back to the database server which provides a derived URL for that product). If a price is successfully scraped from the built URL, that URL can itself be sent to the database server as a query to see whether it can be found in a group, and so on. Control then passes to the step 540 for the results to be displayed as before.

If however a unique identifier cannot be obtained, then at a step 920 the current page is scraped for a manufacturer product number (MPN). This is a more ambiguous identification, because MPNs appear in many different forms, such as with and without spaces, and with and without punctuation. So for example the following might all refer to the same product:
TCB-321-X
TCB321X
TCB 321 (x)

If an MPN cannot be obtained then the process is aborted. However, if an MPN is found then at a step 930 it is "normalised" (which could take place at the extension software, but preferably takes place at the database server), which means removing any spaces and punctuation, and expressing all characters in the same case (e.g. upper case).

The MPN can then be used in the same way as the unique identifier mentioned above, to find a competitor's page offering that product at a step 950. The brand of the item can also be used as additional confirmation of the validity of the match by checking that both items have the same brand. Because of the ambiguity involved in the use of normalised MPNs, optionally, an assisted match process can be carried out at a step 940. This involves passing the details which have been generated automatically to a real-time human operator known as a "Mechanical Turk" (see Reference 2) to confirm whether the match is correct.

Prices are then obtained as described above, but at a step 960 any prices which have more than a threshold difference (e.g. a 50% difference) from the price on the currently viewed page are excluded, as these may well indicate poor matches. Control then returns to the step 540.

Figures 8, 9:
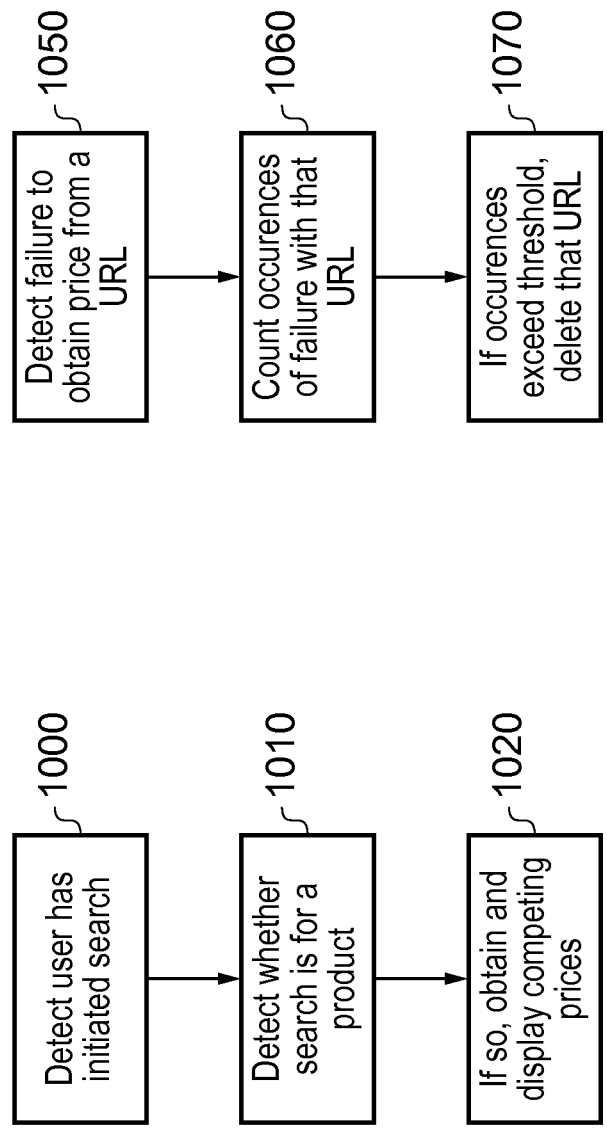
FIG. 8 is a schematic flow diagram illustrating a price comparison process relating to search results.
FIG. 9 is a schematic flow diagram illustrating a process for handling failed price scraping operations.

FIG. 8 is a schematic flow diagram illustrating a price comparison process relating to search results. This is a way of linking the real time price comparison functionality described above to the search results generated by a conventional search engine run within the web browser 190. This technique is not limited to search sites only. For example, it can be carried out with respect to product review sites. If the user is browsing a page with a review of Nikon® D3000™ camera, they may well be willing to buy it, so the system may show the list of prices.

At a step 1000, the web browser detects (from the current URL being accessed) that the user has initiated a search for a particular item. Here it is noted that the current URL not only indicates that a search engine is in use, but also the keywords which are being searched. So the URL relating to a search query may follow the general form:
www.search_engine_name.com/query="DVD Brief Encounter"

From this URL, the web browser can extract at a step 1010 that the user is searching for a DVD of the film "Brief Encounter". Using this information, the web browser applies the processing described above to identify prices for that particular product at a step 1020. However, in order to do this, certain additional features are required.

The first additional feature is that the product identified in the search engine URL must be linked to a URL or a group of URLs in the database held by the database server 300. There are various ways in which this can be done. Perhaps the most straightforward is as follows:

(a) the web browser examines the list of citations provided by the search engine (b) if one of those citations is for a product at a particular predefined online retailer (or the highest ranked citation from one of a predefined set of online retailers) then the web browser uses the URL of that search citation as a query (step 500) to the database server 300. In this instance, the step 540 will include displaying all of the group of URLs as affiliate hyperlinks, including the one identified as the search query to the database server 300. Even if the URL is not part of a group of URLs, it can still be displayed alone.

This technique conveniently allows the search engine and the particular online retailer to carry out the relatively hard task of identifying a particular product from what may be an ill-defined search term initially typed by the user.

Another possibility is that the database held by the database server 300 includes keywords for each group of URLs. The web browser sends the search terms (rather than the current URL) to the database server in the step 500, and known keyword matching techniques are used by the database server to identify the group of URLs most relevant to those search terms. As a further refinement of this technique, the web browser can detect, before implementing this modified version of the step 500, whether the search engine has raised any citations (or any citations in the top n citations, where n might equal 5) which relate to price comparison or online shopping sites. If not, then the web browser assumes that the current search is not a search for a product, and so takes no action.

Another possibility is that the database held by the online shop database 200 includes keywords for each group of URLs. The web browser sends the search terms (rather than the current URL) to the online shop database, and known keyword matching techniques are used by the database server to the most relevant product. This product URL is then submitted to the database server in the step 500 to derive the URLs of competitors' offerings of the same product. As a further refinement of this technique, the web browser can detect, before implementing this modified version of the step 500, whether the search engine has raised any citations (or any citations in the top n citations, where n might equal 5) which relate to price comparison or online shopping sites. If not, then the web browser assumes that the current search is not a search for a product, and so takes no action. This effectively describes our method of submitting keywords to a shopping site's application programming interface (API) (not to the system's own server) so that it can try to find a match. An additional variation is also possible: rather than simply submitting the user-entered keyword string to the shopping site API, the system can scrape the first x words of the first product/shopping result from a search engine and submit these to the shopping site API.

Finally, FIG. 9 is a schematic flow diagram illustrating a process for handling failed price scraping operations. At a step 1050, the web browser 190 detects a failure to obtain a price from a URL supplied by the database server at the step 510. The failure could relate to the fact that the web page identified by that URL no longer exists, or that even after a maximum number of followed links (the step 650) a price cannot be identified, or simply that after a threshold time (e.g. ten seconds) it had not been possible to obtain a price from that URL. Another common reason scrapings fail is that the html layout is changed by the retailer. The web browser communicates this failure to the database server.

At a step 1060, the database server increments a count of failed attempts relevant to that URL. The counts for each URL are compared to a threshold count at a step 1070. If the count for a particular URL exceeds the threshold, then that URL is deleted from the database held by the database server 300. In other embodiments, the counter alone is not sufficient to delete a URL. Consider an example in which there is a popular product at a popular retailer and that retailer changes the html layout, so the scrapers fail on that product (and all others) The counter will have a high value but it would be wrong to delete that URL because it is actually valid. Instead, the system may take into account the relative number of failures for this retailer and delete the URL only if its failure counter is high while the overall failure counter for the retailer is low. If this results in a group now holding only one remaining URL, then optionally the database server can delete the one remaining URL in that group.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

As an example of a possible modification, the copy of the database to which the browser refers in the step 500 need not be held by the database server; a primary copy could be held by the browser, and just updated from time to time by the database server.

REFERENCES

Reference 1: http://en.wikipedia.org/wiki/Firefox_extension—as retrieved on 18 Mar. 2010
Reference 2: https://www.mturk.com/mturk/welcome—as retrieved on 18 Mar. 2010
Reference 3: http://www.nytimes.com/2010/02/08/technology/internet/08price.html as retrieved on 18 Mar. 2010

We claim:

1. A data processing system comprising:
a client device connectable to the internet, the client device having a web browser for accessing information via the internet;
wherein the web browser comprises extension software, the extension software cooperating with the web browser to cause the web browser to:
send a query to a server computer when the browser accesses a current internet address from an online retailer internet page for a current item being viewed;
receive a list providing one or more groups of internet addresses of other online retailer internet pages from the server computer in response to the query, each group having two or more internet addresses each relating to different respective other retailers' offerings of an item for purchase, so that when information derived from the current internet address being accessed by the web browser relates to such a group of internet addresses, wherein the other internet addresses in the group relate to the current item being viewed;
detect a price of the current item from each of the internet addresses in the group by comparing patterns in code used by online retailers associated with the internet addresses to patterns corresponding to retail prices in a database;
display a comparison of two or more prices for the current item detected by the web browser from each of the internet addresses in the group and indicate a lowest price for the current item while displaying the internet page relating to the current internet address on a display; and
provide a hyperlink to at least the internet page relating to the lowest priced offering of the current item, wherein the hyperlink is configured to provide an identification of a provider of the extension software to a corresponding online retailer web page or an affiliate network, when the hyperlink is accessed with the web browser.

2. A data processing system according to claim 1, comprising the server computer, connected to the client device via the internet, on which the list is stored.

3. A data processing system according to claim 2, in which:
the web browser is operable to transmit each internet address accessed by the web browser to the server computer via the internet; and
the server computer is operable to compare an internet address received from the client device's web browser with internet addresses in the list and, if the received internet address is within a group, to return at least the other internet addresses of the group to the client device.

4. A data processing system according to claim 3, in which:
the extension software is operable to detect a failed attempt to obtain a price from an internet address supplied to the web browser by the server computer and to transmit a message to the server computer indicating such a failed attempt;
the server computer is operable to store data representing a count of failed attempts for each internet address in the list, and to delete an internet address from the list in the case that the count relating to that internet address exceeds a threshold count.

5. A data processing system according to claim 1, in which, for an internet address not found in any group in the list, the extension software is operable to derive product identification information from the current internet page and to generate an internet address for an alternative internet page from that product identification information.

6. A data processing system according to claim 1, in which the extension software is operable to detect whether an internet page accessed in response to an internet address in the group contains a hyperlink towards the price of the current item and, if so, the web browser is operable to follow that hyperlink.

7. A data processing system according to claim 1, in which the information derived from a current internet address comprises the current internet address itself.

8. A data processing system according to claim 1, in which:
each group of internet addresses in the list has associated product identification information; and
the information derived from a current internet address comprises product identification information derived from a web page accessed by that internet address.

9. A data processing system according to claim 1, in which the group of internet addresses is derived from the list in response to a query from the web browser.

10. A data processing system according to claim 1, in which the extension software is operable to detect, from a current internet address being accessed, whether a user has initiated a search for a product using a search engine; and if so, the web browser is operable to derive information to access a group of internet addresses in the list from the search engine's search specification or search results.

11. A method of operation of a web browser running on a client device connectable to the internet, the method comprising:
sending a query to a server computer by executing extension software cooperating with the web browser when the browser accesses a current internet address from an online retailer internet page for a current item being viewed;
receiving a list from the server computer by executing the extension software cooperating with the web browser in response to the query, the list providing one or more groups of internet addresses of online retailer internet pages, each group having two or more internet addresses each relating to different respective retailers' offerings of an item for purchase, so that when information derived from the current internet address being accessed by the web browser relates to such a group of internet addresses, wherein the other internet addresses in the group relate to the current item being viewed;
detecting a price of the current item from each of the internet addresses in the group by executing the extension software cooperating with the web browser that compares patterns in code used by online retailers associated with the internet addresses to patterns corresponding to retail prices in a database;
comparing two or more prices detected by the web browser from each of the internet addresses in the group by executing the extension software cooperating with the web browser and indicating a lowest price for the current item while displaying the internet page relating to the current internet address on a display; and
providing a hyperlink to at least the internet page relating to the lowest priced offering of the current item by executing the extension software cooperating with the web browser, wherein the hyperlink is configured to provide an identification of a provider of the extension software in use on the client device a corresponding online retailer or an affiliate network, when the hyperlink is accessed with the web browser.

12. A method according to claim 11, wherein
the web browser transmits each internet address accessed by the web browser to the server computer via the internet and, in response, receives from the server computer a list of list of one or more other internet addresses of a group that contains the transmitted internet address.

13. A method according to claim 12, comprising:
the web browser detecting a failed attempt to obtain a retail price from an internet address supplied to the web browser by the server computer;
the web browser transmitting a message to the server computer indicating such a failed attempt;
the server computer storing data representing a count of failed attempts for each internet address in the list; and
the server computer deleting an internet address from the list in the case that the count relating to that internet address exceeds a threshold count.

14. A method according to claim 11, comprising:
for an internet address not found in any group in the list, deriving product identification information from the current internet page and generating an internet address for an alternative internet page from that product identification information.

15. A method according to claim 11, comprising detecting whether an internet page accessed in response to an internet address in the group contains a hyperlink towards the price of the current item and, if so, following that hyperlink.

16. A method according to claim 11, comprising:
detecting, from a current internet address being accessed, whether a user has initiated a search for a product using a search engine; and if so, deriving information to access a group of internet addresses in the list from the search engine's search specification or search results.

17. The system of claim 1, wherein the extension software is configured to perform one or more of the following as a background process: sending the query to the server computer when the browser accesses a current internet address from an online retailer internet page for a current item being viewed, receiving the list from the computer server, detecting the price of the current item being viewed, comparing the two or more prices detected by the web browser, or providing the hyperlink to at least the internet page relating to the lowest priced offering of the current item.

18. The method of claim 11, wherein the extension software performs one or more of the following as a background process: sending the query to the server computer when the browser accesses a current internet address from an online retailer internet page for a current item being viewed, receiving the list from the computer server, detecting the price of the current item being viewed, comparing the two or more prices detected by the web browser, or providing the hyperlink to at least the internet page relating to the lowest priced offering of the current item.

19. The system of claim 1, wherein the extension software is configured to send the query to the server computer when the browser accesses a current internet address from an online retailer internet page for a current item being viewed as a background process without having the browser visit a price comparison site.

20. The method of claim 11, wherein the extension software sends the query to the server computer when the browser accesses a current internet address from an online retailer internet page for a current item being viewed as a background process without having the browser visit a price comparison site.

* * * * *